US012643784B2

(12) United States Patent
Lee et al.

(10) Patent No.: US 12,643,784 B2
(45) Date of Patent: Jun. 2, 2026

(54) BEVERAGE PREPARATION SYSTEM

(71) Applicant: Towngas Lifestyle IP Limited, North Point (HK)

(72) Inventors: Ho Leung Lee, North Point (HK); Wai Wah Ng, North Point (HK); Ngai Hin So, North Point (HK); Ka Yin Ngai, North Point (HK); Kwun To Chan, North Point (HK); Chi Chung Chan, North Point (HK)

(73) Assignee: Towngas Lifestyle IP Limited, North Point (HK)

( * ) Notice: Subject to any disclaimer, the term of this patent is extended or adjusted under 35 U.S.C. 154(b) by 720 days.

(21) Appl. No.: 17/972,872

(22) Filed: Oct. 25, 2022

(65) Prior Publication Data

US 2023/0129525 A1 Apr. 27, 2023

(30) Foreign Application Priority Data

Oct. 25, 2021 (HK) ............................ 32021041189.0

(51) Int. Cl.
*B67D 1/08* (2006.01)
*A47J 31/46* (2006.01)
(Continued)

(52) U.S. Cl.
CPC .......... *B67D 1/0888* (2013.01); *A47J 31/461* (2018.08); *A47J 31/521* (2018.08);
(Continued)

(58) Field of Classification Search
CPC .... B67D 1/0888; B67D 1/0017; A47J 31/461; A47J 31/521; A47J 31/5253;
(Continued)

(56) References Cited

U.S. PATENT DOCUMENTS 4,792,059 A * 12/1988 Kerner ..................... B67D 3/00
222/144.5
5,724,883 A * 3/1998 Usherovich ............. A47J 31/46
99/290

(Continued)

FOREIGN PATENT DOCUMENTS

AU 2021106476 A4 * 11/2021
CN 102481067 5/2012
(Continued)

*Primary Examiner* — Paul R Durand
*Assistant Examiner* — Michael C Patterson
(74) *Attorney, Agent, or Firm* — Renner, Kenner, Greive, Bobak, Taylor & Weber

(57) ABSTRACT

A beverage preparation system and a method for preparing a beverage thereby, which includes at least one ingredient container for containing an ingredient; a dispenser for dispensing the ingredient from the at least one ingredient container for preparation of a beverage; a controller for controlling the operation of the dispense; and a wireless communication module associated with the controller for receiving instructions from a remote device via wireless communication to exercise control via the controller upon the dispenser for reserving a specific portion of the ingredient in the ingredient container.

22 Claims, 15 Drawing Sheets

(51) Int. Cl.
| | |
|---|---|
| *A47J 31/52* | (2006.01) |
| *B01F 35/221* | (2022.01) |
| *B01F 35/90* | (2022.01) |
| *B01F 101/14* | (2022.01) |
| *B67D 1/00* | (2006.01) |

(52) U.S. Cl.
CPC ....... *A47J 31/5253* (2018.08); *B01F 35/2215* (2022.01); *B01F 35/90* (2022.01); *B67D 1/0017* (2013.01); *B01F 2035/98* (2022.01); *B01F 2035/99* (2022.01); *B01F 2101/14* (2022.01)

(58) Field of Classification Search
CPC .. B01F 35/2215; B01F 35/90; B01F 2035/98; B01F 2035/99; B01F 2101/14
USPC ............ 99/280, 275, 325; 222/146.1, 144.5, 222/145.5, 129.1
See application file for complete search history.

(56) References Cited

U.S. PATENT DOCUMENTS

| | | | | |
|---|---|---|---|---|
| 6,182,555 | B1 * | 2/2001 | Scheer .................... | A47J 31/40 99/290 |
| 6,240,829 | B1 * | 6/2001 | McGarrah ............ | B67D 1/1218 366/160.5 |
| 6,871,675 | B1 * | 3/2005 | Marszalec ................. | C02F 9/20 141/82 |
| 7,594,525 | B2 * | 9/2009 | Girard ................. | B67D 3/0032 141/351 |
| 7,918,156 | B2 * | 4/2011 | Greenwald ............. | A47J 31/56 222/145.5 |
| 7,997,448 | B1 * | 8/2011 | Leyva .................. | B67D 1/1247 222/1 |
| 8,196,776 | B2 * | 6/2012 | Doglioni Majer .... | A47J 31/402 222/64 |
| 8,276,787 | B1 * | 10/2012 | Gremillion .......... | B67D 1/0004 222/64 |
| 8,491,786 | B2 * | 7/2013 | Kim .................... | B67D 1/0004 210/195.1 |
| 8,636,174 | B1 * | 1/2014 | Motkowski .......... | B67D 1/0895 222/145.5 |
| 11,059,713 | B1 * | 7/2021 | Connor ................ | G06Q 20/385 |
| 11,109,708 | B2 * | 9/2021 | Lecomte ............. | B67D 1/0085 |
| 2002/0083842 | A1 * | 7/2002 | Kown .................. | B67D 1/0044 99/290 |
| 2002/0130137 | A1 * | 9/2002 | Greenwald .......... | A47J 31/467 99/290 |
| 2008/0201241 | A1 | 8/2008 | Pecoraro | |
| 2010/0049362 | A1 * | 2/2010 | Hatuka ................. | B67D 1/124 99/275 |
| 2012/0138632 | A1 * | 6/2012 | Li ........................... | A47J 31/56 222/64 |
| 2012/0156339 | A1 | 6/2012 | Studor et al. | |
| 2013/0233887 | A1 * | 9/2013 | Ford .................... | B67D 1/1231 222/1 |
| 2014/0166053 | A1 | 6/2014 | Carson et al. | |
| 2014/0209629 | A1 * | 7/2014 | Gates .................. | B67D 1/0044 222/1 |
| 2014/0346188 | A1 * | 11/2014 | Girard ................. | A47L 15/4418 99/275 |
| 2015/0034674 | A1 * | 2/2015 | Hertensen ........... | B67D 1/0801 222/145.5 |
| 2016/0096717 | A1 * | 4/2016 | Keating ............... | B67D 3/0041 222/1 |
| 2016/0368753 | A1 * | 12/2016 | Bethuy ............... | A47J 31/4403 |
| 2018/0194258 | A1 * | 7/2018 | Strauss .................. | A47J 31/56 |
| 2019/0059633 | A1 * | 2/2019 | Bhutani ............... | B67D 1/0068 |
| 2020/0175797 | A1 * | 6/2020 | Jee ........................ | H04W 4/023 |
| 2021/0130148 | A1 * | 5/2021 | Zemko .................. | B67D 1/005 |
| 2021/0361112 | A1 * | 11/2021 | Hobden ............. | A47J 31/5251 |
| 2021/0362993 | A1 * | 11/2021 | Shafir .................... | G06Q 30/06 |
| 2022/0024748 | A1 * | 1/2022 | Fantappie ............... | B67D 1/04 |

FOREIGN PATENT DOCUMENTS

| | | | | |
|---|---|---|---|---|
| CN | 102640193 | 9/2015 | | |
| CN | 106030670 | 10/2016 | | |
| CN | 111911883 | 11/2020 | | |
| CN | 112056928 | 12/2020 | | |
| EP | 3342319 A1 * | 7/2018 | ............. | A47J 31/44 |
| WO | 2019016650 | 1/2019 | | |

* cited by examiner

BEVERAGE PREPARATION SYSTEM

The present invention relates to a beverage preparation system for preparing and dispensing beverages. In particular, but not exclusively, it relates to a remote control automated beverage preparation system for preparing and dispensing mixed beverages.

BACKGROUND OF THE INVENTION

Automated beverage dispensers and beverage preparation systems for delivery mixed beverages are well known. Such dispenser usually includes mixing of beverages on demand. A pre-formulated mixed beverage can be prepared by the beverage dispenser once instructions is given to prepare a specific mixed beverage selected from the available. Instructions are provided usually by pressing a button on a user interface on a front face of the beverage dispenser. It is not uncommon for user to find out a preferred beverage has been consumed until such information is displayed on the user interface by way of a small red light indicator. As the indicator is small, it cannot be spotted remotely. Often, the information is not perceived until the user is in front of the beverage dispenser. This can be rather frustrating.

A beverage dispenser has many parts and because it is used for preparing beverages, cleanliness is of paramount importance. Cleaning all the relevant internal parts of a beverage dispenser is not an easy task and can be time consuming. More often than not, the ingredients for preparing the mixed beverage are sweet and sticky. They tend to stay on the parts that mix the beverage and those in the beverage delivery system. Continuous and prolong exposure of those parts to the sweet sticky ingredients result in building up of residue that form clogs. These clogs when dried are very difficult to clean and remove.

The invention seeks to eliminate or at least to mitigate such problems by providing a new or otherwise improved beverage dispenser.

SUMMARY OF THE INVENTION

According to a first aspect of the invention, there is provided a beverage preparation system comprising at least one ingredient container for containing an ingredient; a dispenser for dispensing said ingredient from said at least one ingredient container for preparation of a beverage; a controller for controlling the operation of the dispenser; and a wireless communication module associated with the controller for receiving instructions from a remote device via wireless communication to exercise control via the controller upon the dispenser for reserving a specific portion of said ingredient in the ingredient container.

Preferably, the controller generates an identifier based on said instructions from said remote device.

More preferably, the controller dispatches the identifier via the wireless communication module to said or another remote device.

Furthermore preferably, the controller is associated with an input device for retrieving information from the identifier upon its presentation via said remote device.

Yet further more preferably, the controller exercises control over the dispenser based on information retrieved from the identifier by the input device for bringing about release of a reserved portion of ingredient from the ingredient container.

It is preferred that the dispenser includes an outlet guarded by a valve for controlling an amount of ingredient to be dispensed therefrom.

It is further preferred that the valve comprises an electromechanically operated valve.

In a preferred embodiment, the dispenser includes a first ingredient container for containing a diluting agent and a second ingredient container for containing a flavored liquid.

More preferably, t containers each with respective valves for bringing about release of a predetermined amount of ingredient from the respective ingredient containers.

Furthermore preferably, the dispenser includes a mixer downstream of the ingredient containers for receiving and mixing said ingredients released from the ingredient containers via the respective valves.

Yet further more preferably, the first ingredient container is configured to release the diluting agent to the mixer before the second ingredient container releases said flavored liquid.

Yet yet further more preferably, the diluting agent comprises water.

It is preferred that at least one of the ingredient containers is in fluid communication with a temperature adjuster for adjusting temperature of said ingredient released from the ingredient container.

It is preferred that the first ingredient container is associated with a temperature adjuster for adjusting temperature of said diluting agent released from the ingredient container.

It is further preferred that the temperature adjuster includes a heater and a cooler both in fluid communication with the first ingredient container for adjusting temperature of said diluting agent.

It is yet further preferred that the heater and cooler are in parallel fluid connection with the first ingredient container.

It is preferred that the heater and the cooler are in fluid communication with a first pre-mixer for mixing said diluting agent from the heater and cooler to attain a predetermined temperature.

It is further preferred that the first pre-mixer is in fluid communication with the mixer for delivering said diluting agent of predetermined temperature into the mixer in advance of delivery from the second ingredient container.

It is yet further preferred that the first pre-mixer is in parallel connection with the mixer and a second pre-mixer while the second 1 ingredient container is in fluid communication with the mixer via the second pre-mixer.

It is preferred that the first pre-mixer is configured to prime the mixer by releasing said diluting agent to the mixer before the second pre-mixer releases said flavored liquid.

In a preferred embodiment, the controller is configured to exercise control over the ingredient container based on instructions received from said remote device, for customizing amount of said ingredient released from the ingredient container.

More preferably, the controller is configured to exercise control over the ingredient container in response to instructions received via an identifier generated based on instructions from said remote device.

Furthermore preferably, the identifier is generated by the controller and sent wirelessly to said remote device.

In a preferred embodiment, the dispenser includes a self-detection module in communication with the controller, the self-detection provides information in relation to status of the dispenser to the controller which generates an indication for sending to said remote device via the wireless communication module.

It is preferred that the mixer comprises a funnel.

According to a second aspect of the invention, there is provided a method for preparing a beverage by the aforesaid beverage preparation system, comprising the steps of:

providing instructions to a dispenser by a remote device for preparing a beverage, receiving the instructions by a controller via a wireless communication module in the dispenser, reserving a portion of ingredient by the controller for preparing said beverage, generating an identifier based on the instructions provided by the remote device, sending the identifier to the remote device, presenting the identifier received by the remote device to the controller, and releasing the reserved portion of ingredient for the dispenser to prepare said beverage in response to instructions from the controller.

Preferably, the identifier is generated by the controller and is presented to the controller for preparing said beverage.

More preferably, the method further comprising the step of providing a reader to the controller for reading the identifier.

According to a third aspect of the invention, there is provided a method for preparing a beverage by the aforesaid beverage preparation system, comprising the steps of:

providing a first ingredient container for containing a diluting agent and a second ingredient container for containing a flavored liquid;

providing a mixer in fluid communication with the first and second ingredient containers; and establishing fluid communication between the first ingredient container and the mixer before the second ingredient container is in fluid communication with the mixer.

Preferably, the method further comprises the step of:

instructing the second ingredient container to release a specific amount of flavored liquid into the mixer.

Preferably, the method further comprises the steps of:

providing a third ingredient container for containing a further flavored liquid; and establishing fluid communication between the third ingredient container and the mixer after the first ingredient container and the mixer are in fluid communication.

More preferably, the second ingredient container and the third ingredient container are in fluid communication with the mixer simultaneously.

More preferably, the method further comprises the step of:

providing a sensor in each of the second ingredient container and the third ingredient container for obtaining information in relation to the ingredient containers; and outputting the information wirelessly for monitoring the ingredient containers remotely.

Furthermore preferably, the information includes status of the relevant ingredient container.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1A:
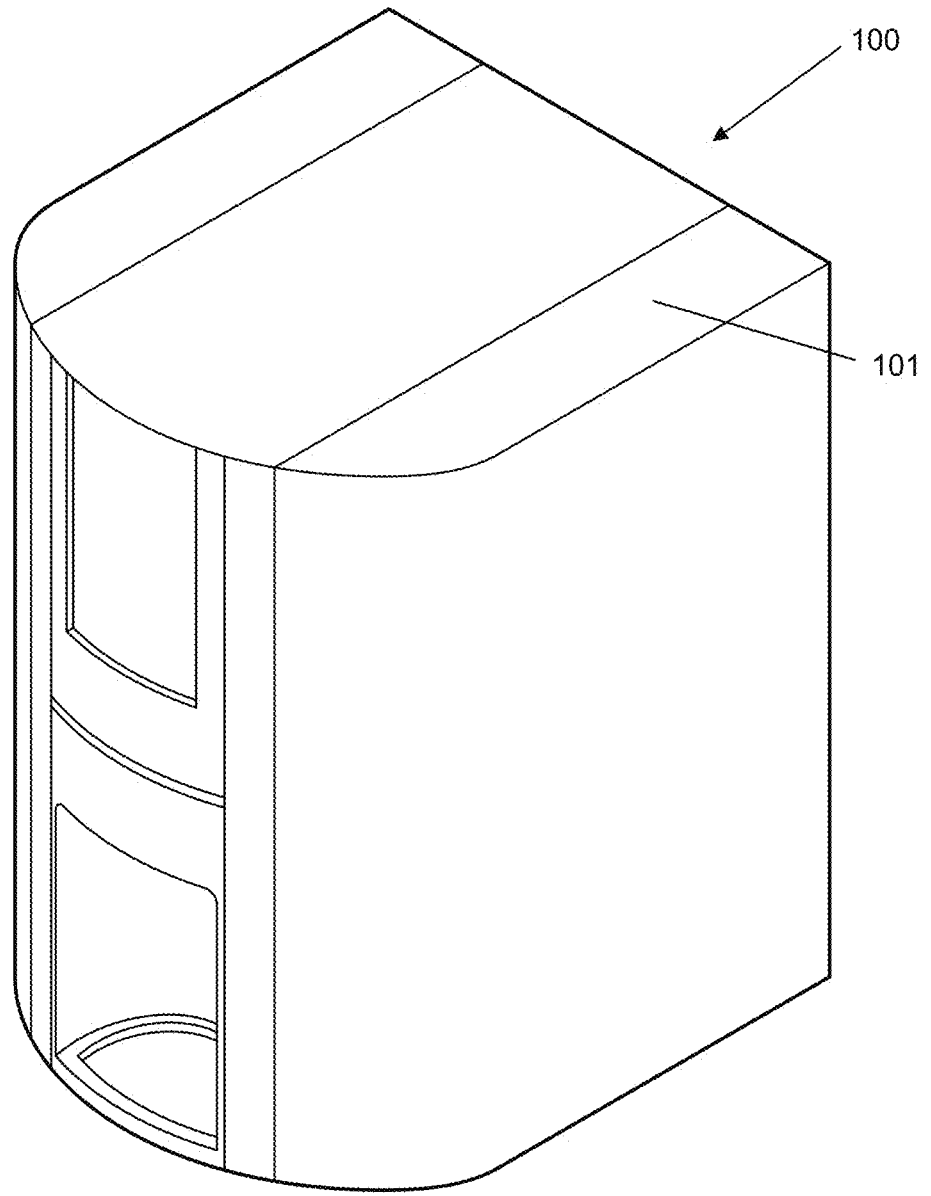
FIG. 1A shows an embodiment of the invention in the form of a beverage dispenser equipped with a beverage preparation system.
Figure 1B:
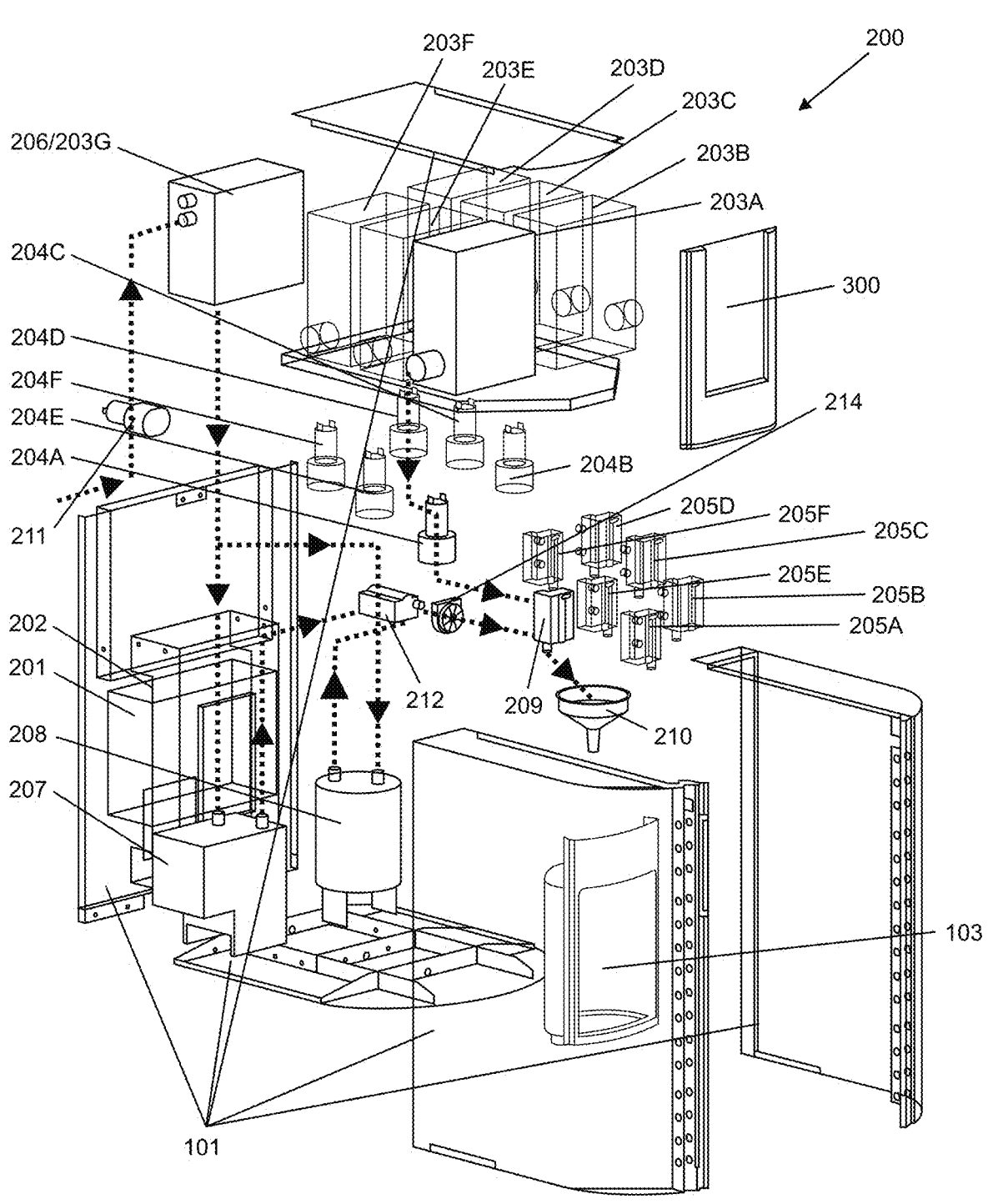
FIG. 1B is an exploded view of the beverage dispenser equipped in FIG. 1A.

Referring to FIGS. 1A and 1B of the drawings, there is shown an embodiment of the invention in the form of a beverage dispenser 100 equipped with a beverage preparation system 200.

The beverage dispenser 100 includes a housing 101 which defines an interior space for containing the beverage preparation system 200. The beverage preparation system 200 includes a controller 201 which is in communication with and exercise control over various parts of the beverage preparation system 200. A wireless communication module 202 which is in communication with the controller 201 for establishing wireless communication with at least one remote device such as a mobile computing device that may be in the form of a mobile phone. The communication with the remote device can be a one-way or two-way communication. The beverage preparation system 200 is configured to prepare beverages from one or more ingredients.

In the embodiment as shown in FIGS. 1A and 1B, there are six ingredient containers 203A to 203F. These ingredient containers 203A to 203F are under the control of the controller 201 via respective pumps 204A to 204F. Ingredients from the respective ingredient containers 203A to 203F are directed to respective second pre-mixers 215A to 215F, which are guarded by respective valves 205A to 205F. Each of the ingredient containers 203A to 203F may contain a different ingredient such as syrup or concentrates in liquid form with different flavors.

A diluting agent in the form of water enters a water tank 206 via a water pump 211. The water tank 206 may be understood as a further ingredient container 203G, which is in communication with and under the control of the controller 201. The water in the water tank 206 acts as a diluting agent for mixing with the syrup or concentrates. The water tank 206 is in fluid communication with a cooler 207 and a heater 208 which are in parallel connection to the water tank 206. Each of the cooler 207 and the heater 208 are in fluid communication with a mixer 210 via a solenoid valve 209. In the specific embodiment, water enters the mixer 210 before any syrup or concentrates. After the mixer 210 is primed, selected ingredient from a relevant ingredient container 203A to 203F enters the mixer 210 via the respective solenoid valves 205A to 205F. Water diluting the ingredient will enter the solenoid valves 205A to 205F via the main water outlet 214 which may or may not be guarded by a valve. There is no intention to limit the diluting agent to water alone. Any other liquid that is usable as a diluting agent may be applied instead of water.

Figure 2:
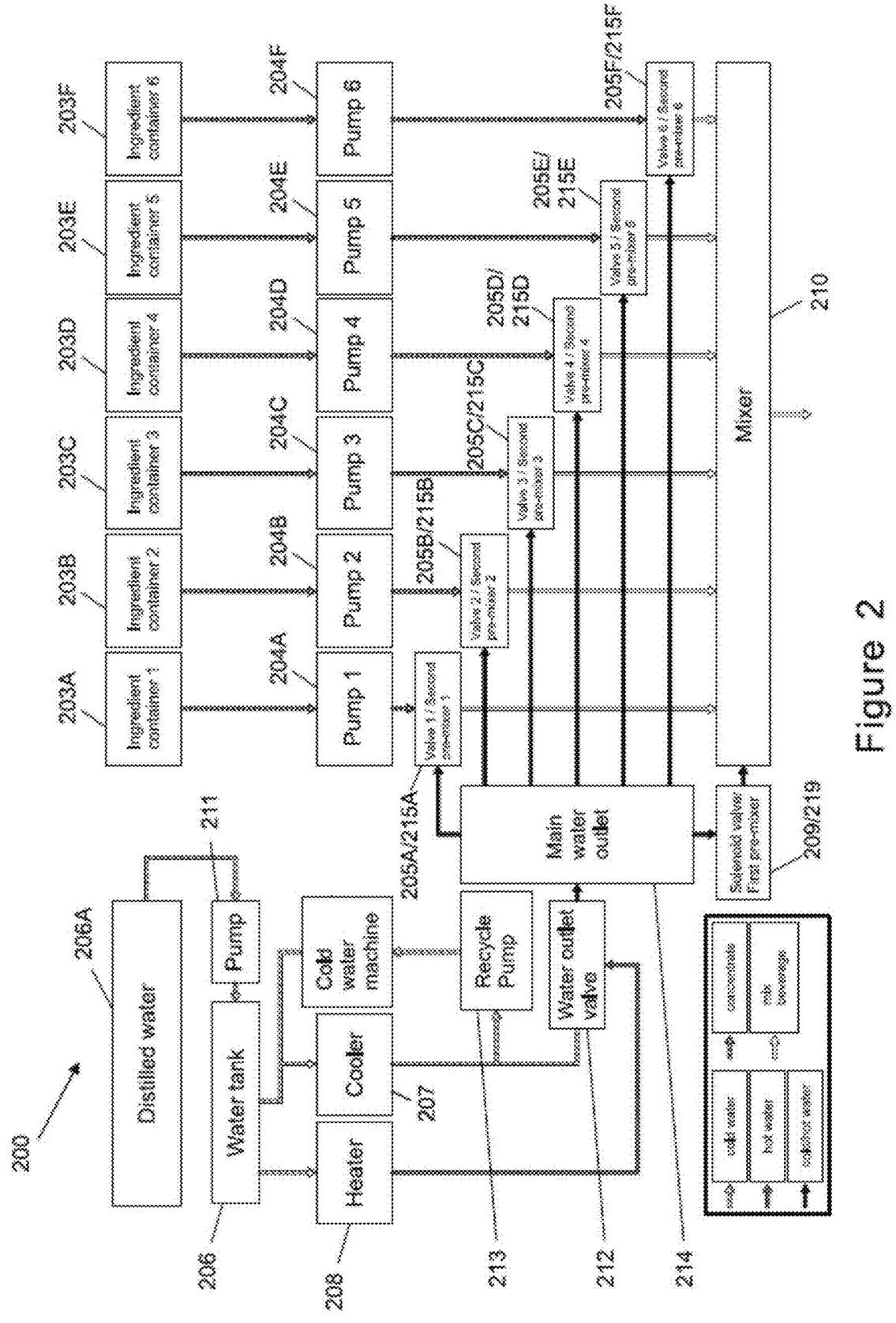
FIG. 2 is a block diagram showing the implementation of the beverage preparation system in FIG. 1.

FIG. 2 shows an example on how the beverage preparation system 200 is implemented. The beverage preparation system 200 includes all of the following features. The water tank 206, which is connected to a distilled water source 206A with distilled water being pumped into the water tank 206 via a water inlet pump 211. Water from the water tank 206 enters the cooler 207 and heater 208 through separated passages. Hot water leaving the heater 208 and at least part of the cold water leaving the cooler 207 to enter a main water outlet 214 via a valve 212. Water from the main water outlet 214 enters a first pre-mixer 219 via second solenoid valve 209. Remainder of the cold water leaving the cooler 207 reenters a recycle pump 213 and is then lead back to the cooler 207. The main water outlet 214 is in fluid communication with the ingredient containers 203A to 203F via respective second pre-mixers 215A to 215F guarded by respective second solenoid valves 205A to 205F. The main water outlet 214 is also in direct fluid communication with the mixer 210 via the first pre-mixer 219 which is again guarded by a valve 209. Water entering the mixer 210 via the first pre-mixer 219 functions as primer to prime the mixer 210 before the syrup or concentrate enters the mixer 210. The water carries the ingredients down the mixer 210 to minimize residue that lingers on an inner surface of the mixer 210. A portion of the water leaving the main water outlet 214 enters one or more of the second pre-mixers 215A to 215F. Respective solenoid valves 205A to 205F guard each of these second pre-mixers 215A to 215F. Different ingredient container 203A to 203F is intended to hold a different ingredient. Depending on the beverage to be made, some or all of the ingredients are used. The relevant ingredient is pumped out of the ingredient container 203A/203B/203C/ 203D/203E/203F by the pump 204A/204B/204C/204D/ 204E/204F to enter the second pre-mixer 215A/215B/215C/ 215D/215E/215F. Via the valve 205A/205B/205C/205D/ 205E/205F of the second pre-mixer 215A/215B/215C/ 215D/215E/215F, the ingredient is mixed with water out of the main water outlet 214 and enters the mixer 210 via the valve in the second pre-mixer 215A/215B/215C/215D/

215E/215F. Distilled water enters the mixer 210 via the first pre-mixer 219 before the mixture from the second pre-mixer 215A/215B/215C/215D/215E/215F enters.

Figure 3:
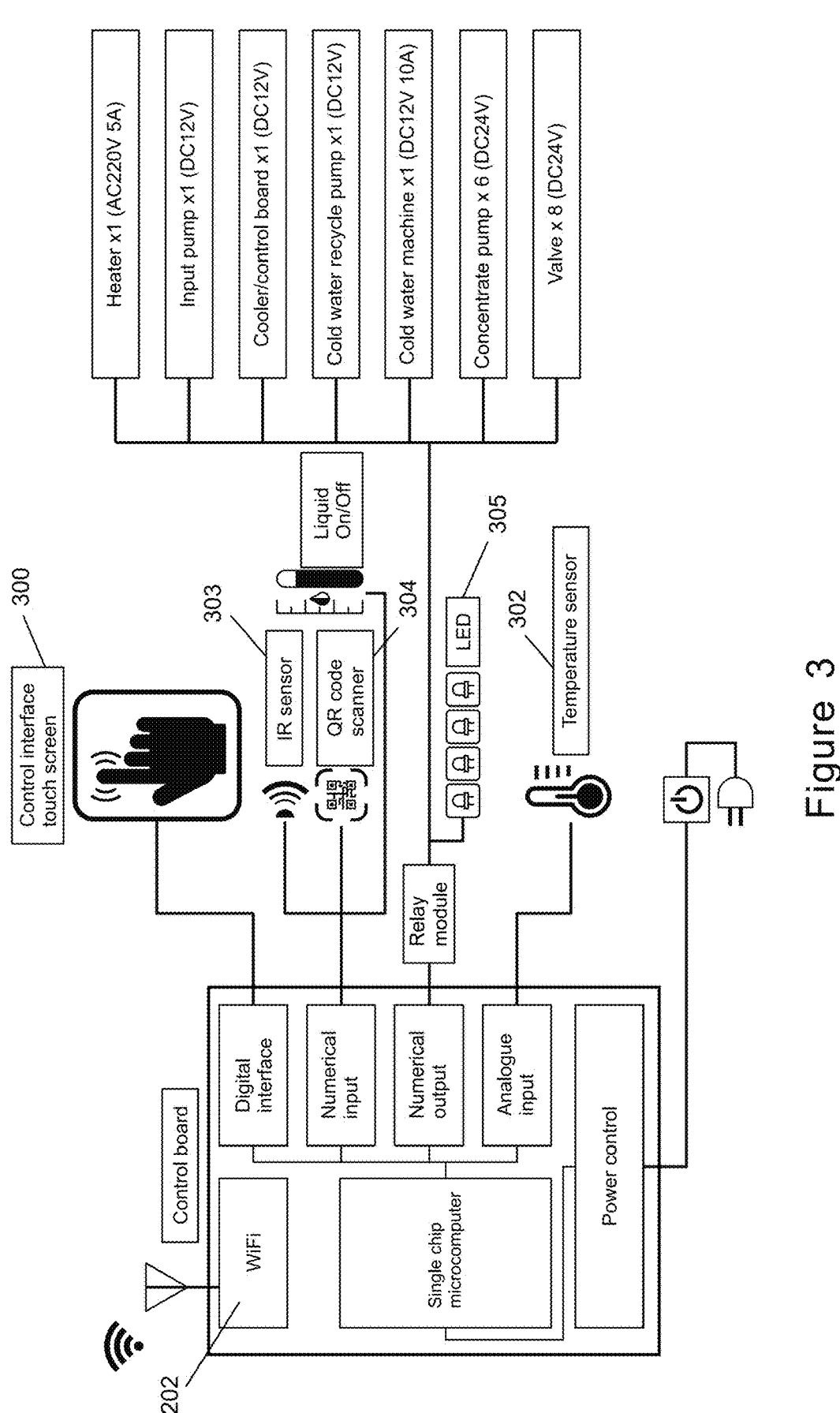
FIG. 3 is a block diagram showing a network of communication paths of the beverage preparation system in FIG. 1.

FIG. 3 shows the communication between various parts of the beverage preparation system 200 to bring about the implementation. The controller 201 is in communication with a local instructions input device 300 installed on the housing 101 of the beverage dispenser 100, in the form of a touch screen. All instructions can be input through the local instructions input device 300. The controller 201 receives instructions input via the local instructions input device 300 and brings about execution of the instructions by communicating with relevant parts of the beverage preparation system 200. The controller 201 is in communication with or includes a wireless communication module 202 which sends and receives instructions wirelessly such that communication between the controller 201 and a remote input device can be established. As an example, a temperature sensor 302 is in communication with the controller 201 so as to monitor temperature of the water in the heater 208 and cooler 207 so as to control the temperature of the water that comes out of the heater 208 and the cooler 207. Another example would be an infrared sensor 303 which is provided adjacent a cup receptacle 103 to detect presence of a cup at the receptacle before the dispensing of beverage is allowed. A further example would be a QR code reader 304. The QR code reader 304 is in communication with the controller 201 for reading a QR code generated by the controller 201 based on instructions received through a remote input device and sent to the remote input device via the wireless module 202. When the remote input device presents the QR code to the QR code reader 304, instructions are provided to the controller 201 to bring about execution of the instructions by communicating with relevant parts of the beverage preparation system 200 for preparing and dispensing a beverage. There are also indicators 305 corresponding to ingredient containers 203A to 203F. These respective indicators 305 provide indication as to level of ingredients in respective ingredient containers 203A to 203F.

FIGS. 6 to 9D are examples of the implementation of the beverage preparation system 200. More specifically, these figures show how various parts of the beverage dispenser 100 cooperate to bring about the preparation and dispensing of an ordered beverage.

Example 1

Figure 6:
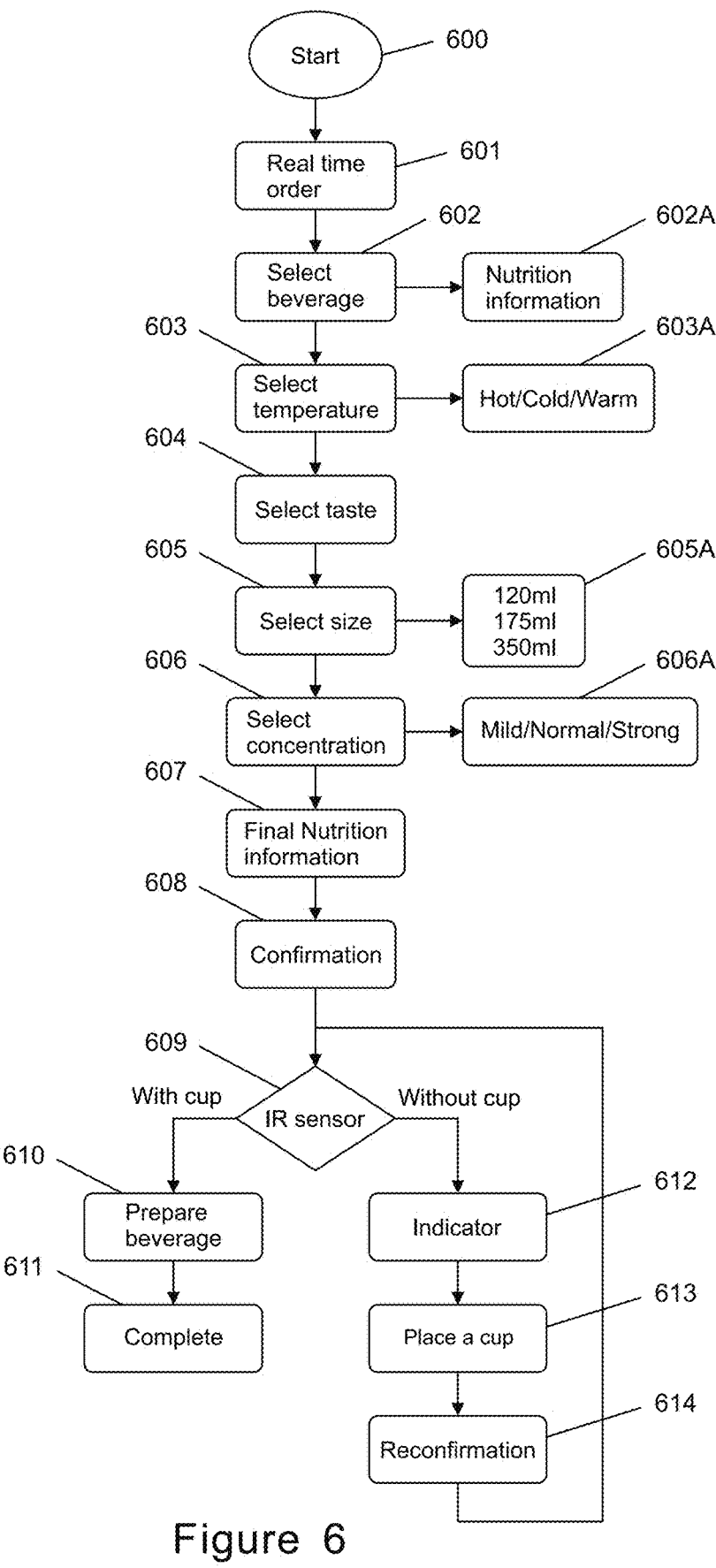
FIG. 6 is a block diagram showing functions of principal parts in the beverage preparation system connected by lines that show the relationship of the parts in an immediate consumption order.

Referring to FIG. 6 which shows the preparation of a customized beverage making use of the local instructions input device 300 by way of a touch screen on the housing 101 of the beverage dispenser 100. A start button 600 is made available on the input device 300, which when initiated will offer an option for real time order 601. When the real time order 601 is selected, a list of preselected beverages 602 is made available for selection and includes nutrition information retrievable at needs 602A. A temperature selection 603 is made available after the beverage is selected from the list. In the example, three temperature options are available for selection including hot, cold and warm 603A. Then selection of preferred taste can be done with the taste selection module 604 e.g. sweetness. Size of the beverage can be selected through the size selection module 605. In this embodiment, the three sizes available are 120 ml, 175 ml and 350 ml 605A. Selection of concentration can be made through the concentration selection module 606 which includes selection between mild, normal and strong 606A. A button 607 is available for checking the final nutrition information of the customized beverage and a confirmation button 608 for confirming the order. After confirmation, the infrared sensor 303/step 609 is initiated for sensing the availability of a cup under an outlet of the beverage dispenser 100. When a cup is available, the customized beverage will be delivered into the cup 610 and 611. If the cup is not available or misplaced, an indicator 612 will be provided on the touch screen 300 to request a cup to be placed under the outlet 613 and a button will appear on the touch screen 300 to ask for reconfirmation before the delivery of the customized beverage 614.

Example 2

Figure 7:
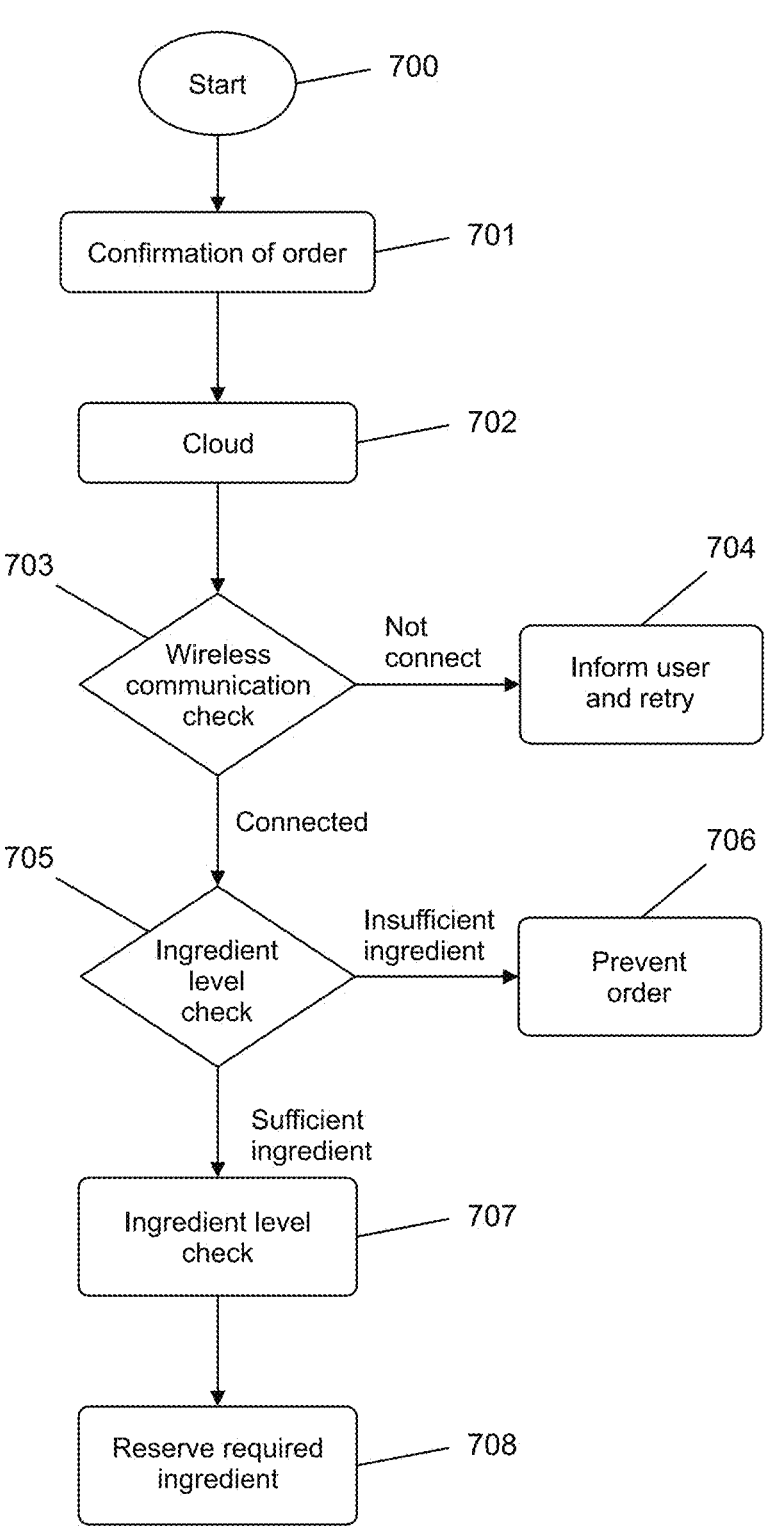
FIG. 7 is a block diagram showing functions of the principal parts in the beverage preparation system connected by lines that show the relationship of the parts in a remote and reserve order.

FIG. 7 shows Example 2 which involves the preparation of a customized beverage making use of a remote device such as a mobile phone. A start button 700 is made available on the mobile phone which when actuated will allow confirmation of ordering 701 via a mobile phone. Such confirmation is sent to the cloud 702 which instructs the wireless communication module 202 of the beverage preparation system 200 or beverage dispenser 100 to ensure the establishment of wireless communication 703. If the wireless communication is properly established, the beverage preparation system 200 will be instructed to check the ingredient level of the required ingredient for preparing the customized beverage and confirm the availability of the required ingredients 705. If not available, selection of the customized beverage is prohibited 704. If the required ingredients are available, selection of the customized beverage is allowed 707 and reservation of the required ingredients is made possible 708. If one or more of the required ingredients is not available, selection of the customized beverage is prohibited 706.

Example 3

Figure 8:
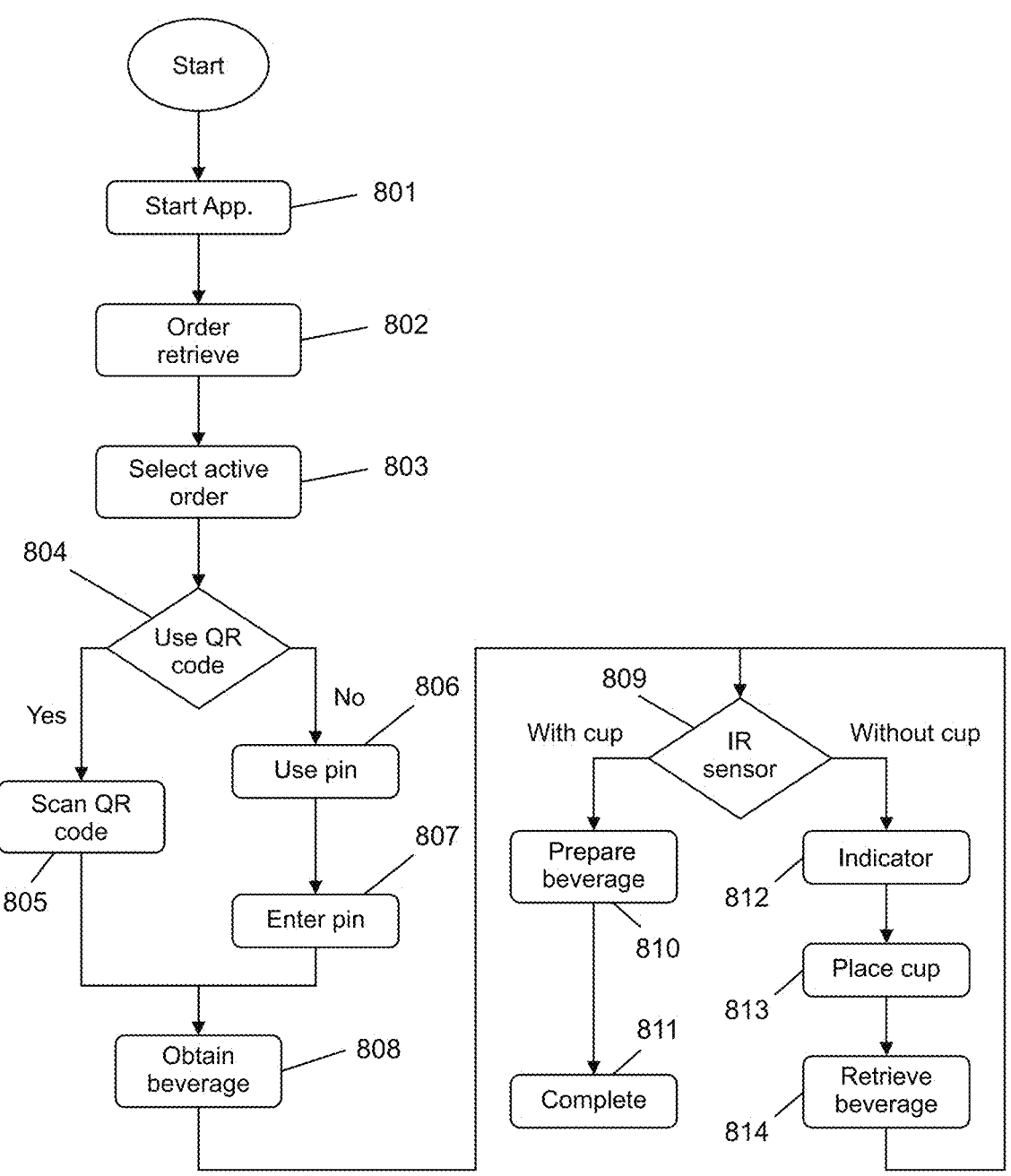
FIG. 8 is a block diagram showing function of the principal parts in the beverage preparation system connected by lines that show the relationship of the principal parts in a beverage retrieval module after the remote and reserve order in FIG. 7.

FIG. 8 shows the retrieving of the customized beverage ordered through the remote device after reservation of the required ingredients is made through Example 2. Once the application is opened on the mobile phone 801, selection for retrieving of the customized beverage 802 is made available. A list of active orders 803 will be provided on the mobile phone for selection. Upon selecting an active order, a selection for use of QR code or pin is available 804. To use a QR code, the QR code is made available on the mobile phone for presenting to the scanner 805 of the beverage dispenser 100/beverage preparation system 200. After scanning, button for confirming the delivery of the customized beverage is made available 808 before delivery. To use a pin 806, the touch screen 300 on the beverage dispenser 100 will provide a space for entering the pin 807. Thereafter, a button for confirming the delivery of the customized beverage is made available 808 for confirmation before delivery. After confirmation, the infrared sensor 303/step 809 is initiated for sensing the availability of a cup under an outlet of the beverage dispenser 100. When a cup is available, the customized beverage will be prepared 810 and delivered into the cup 811. If the cup is not available or misplaced, an indicator 812 will be provided on the touch screen 300 to request a cup to be placed under the outlet 813 and a button will appear on the touch screen 300 to ask for reconfirmation 814 before the delivery of the customized beverage.

Figure 9A:
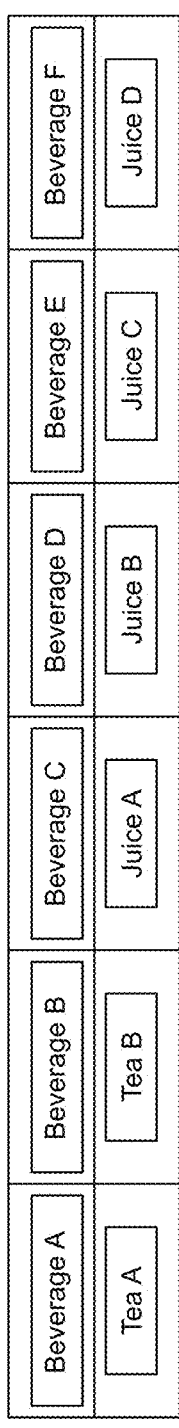
FIG. 9A is a table showing different types of beverages offered by the dispenser with the beverage preparation system in FIG. 1.

FIG. 9A shows a table of six preset beverages for preparation by the beverage dispenser 100/beverage preparation system 200. It includes Beverage A which is Tea A concentrate-ingredient container 203A, Beverage B which is Tea B concentrate-ingredient container 203B, Beverage C which is Juice A concentrate-ingredient container 203C, Beverage D which is Juice B concentrate-ingredient container 203D, Beverage E which is Juice C concentrate-ingredient container 203E and Beverage F which is Juice D concentrate-ingredient container 203F.

Example 4

Figure 9B:
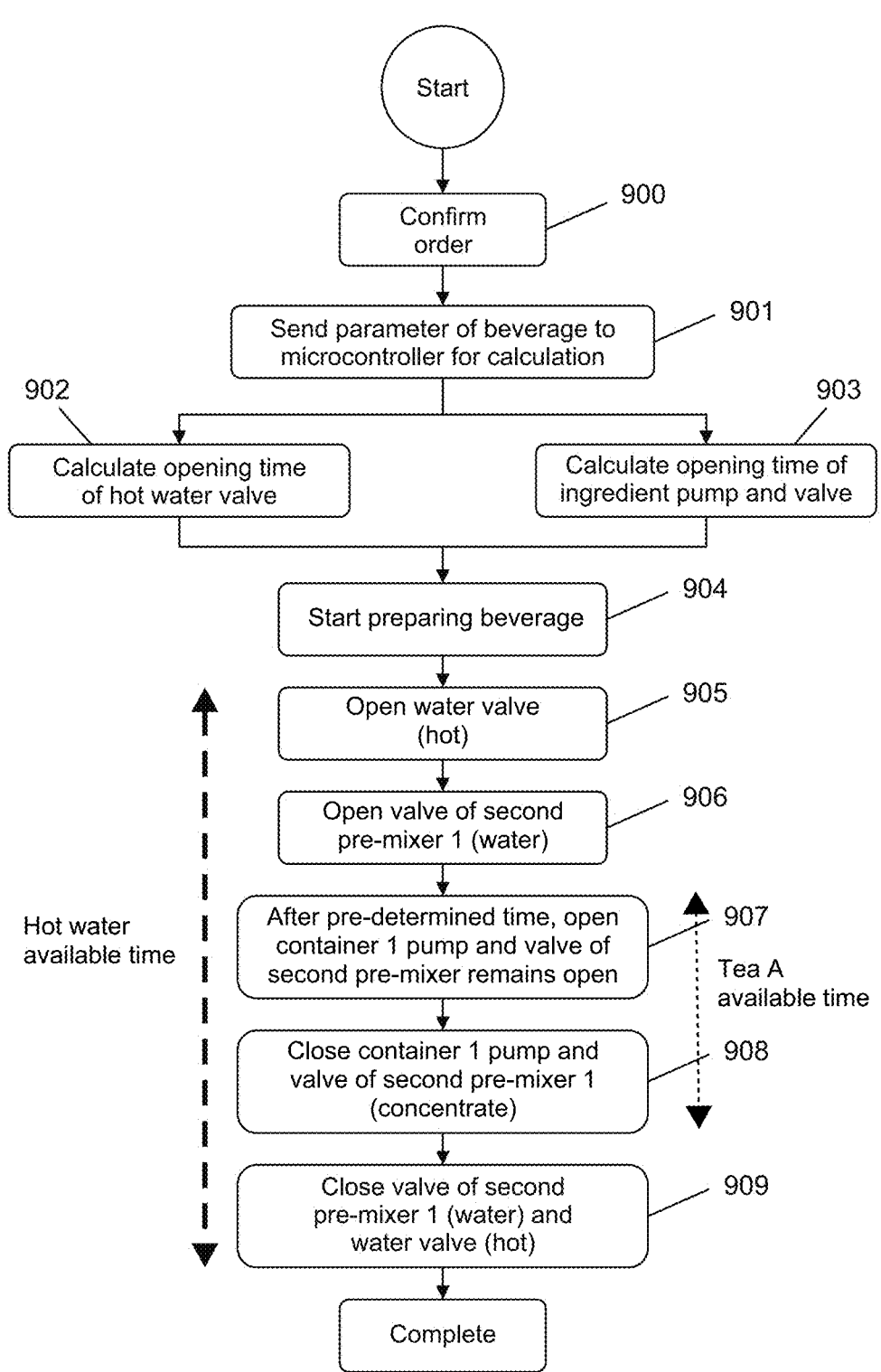
FIG. 9B is a block diagram showing function of the principal parts in the beverage preparation system connected by lines that show the relationship of the principal parts in preparing Beverage A in FIG. 9A.

Turning to FIG. 9B which shows the preparation of a preset beverage making use of two ingredients including water/diluting agent and an ingredient from one of the ingredient containers 203A to 203F. The preset beverage is a cup of Tea A. Once an order is confirmed 900, the instructions are sent to the controller 201 for handling 901. Instructions include parameters such as proportion of ingredients, volume, temperature, concentration and flow. The controller 201 will determine the length of time required for a solenoid valve 212 for the hot water to be kept open 902. The controller 201 will also determine the length of time required for the related solenoid valve 205A of the second pre-mixer 215A to remain open 903. Thereafter, the beverage dispenser 100/beverage preparation system 200 will start to prepare the preselected beverage 904. The 212 for the hot water 212 will be opened 905 to allow hot water to leave the heater. Then the valve 205A of the second pre-mixer 215A will be opened for a predetermined period of time 906 for the hot water to enter the mixer 210. Thereafter, the pump 204A of the Tea A ingredient container 203A is turned on after a predetermined delay 907. The valve 205A in the second pre-mixer 215A is remained open for a predetermined period of time 907 such that a preferred amount of mixture of water and ingredient enters the mixer 210. In step 908, the pump 204A and the valve 205A are closed. Water is allowed to pass through the valve 205A of the second pre-mixer 205A 215A to reach the mixer 210 for a predetermined period of time. The heater 208 and the valve 212 for the hot water are then closed 909. Water is used to pre-lubricate and rinse the mixer 210 before and after the making of the beverage. The water enters the mixer through the second pre-mixer 215A/215B/215C/215D/215E/215F. The preset beverage is then delivered into a cup for consumption 910.

Example 5

Figure 9C:
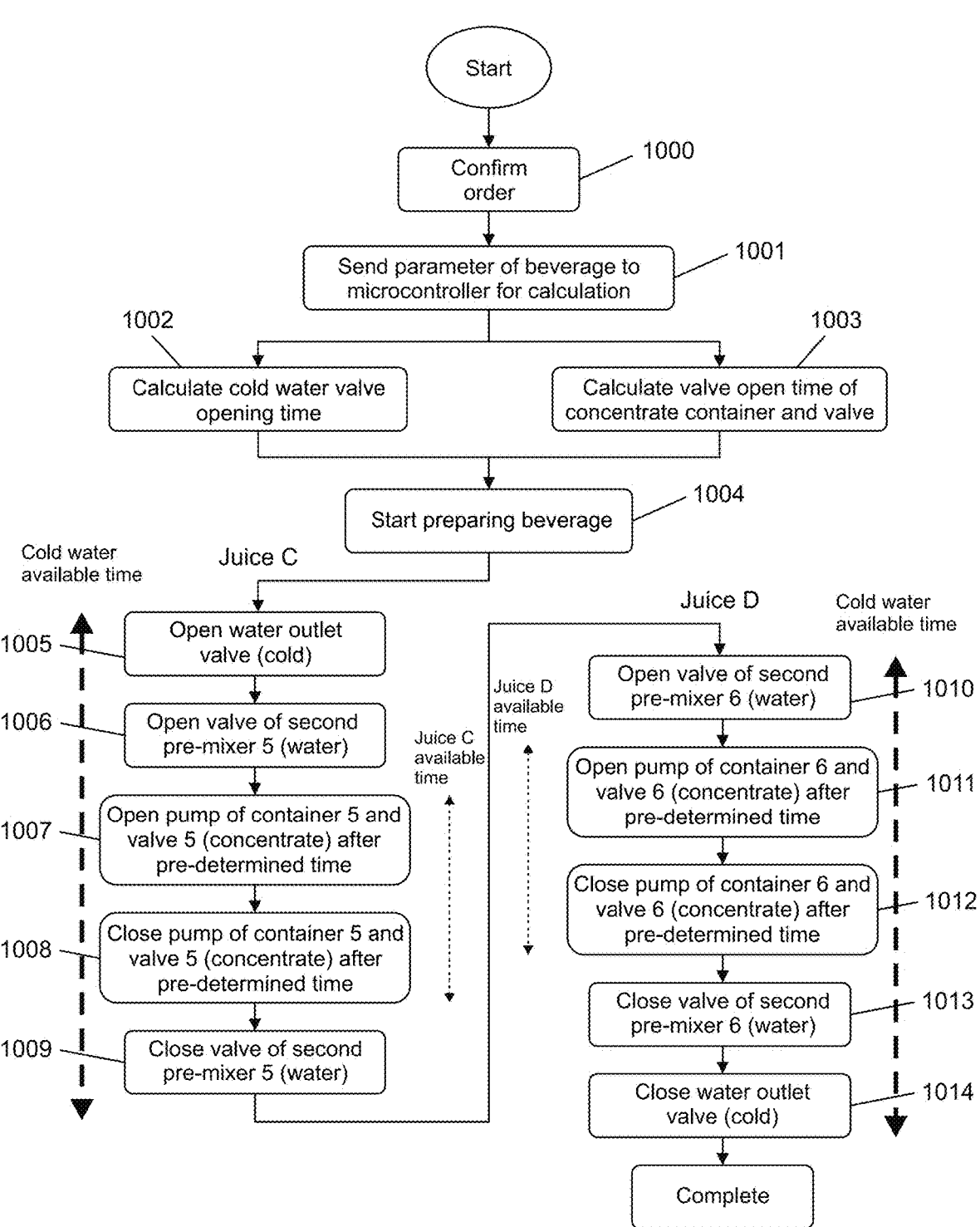
FIG. 9C is a block diagram showing function of the principal parts in the beverage preparation system connected by lines that show the relationship of the principal parts in preparing Beverage E or Beverage F in FIG. 9A.

FIG. 9C shows the preparation of a mixed beverage using three ingredients including water/diluting agent and two ingredients, Juice C and Juice D, from two ingredient containers 203E and 203F. Once an order is confirmed 1000, the instructions are sent to a micro controller 201 for handling 1001. The micro controller 201 will determine the length of time required for a solenoid valve 212 guarding the cold water to be kept open 1002. The controller 201 will also determine the length of time required for the pumps 204E and 204F as well as the valves 205E and 205F of the second pre-mixers 215E and 215F to remain open 1003. Thereafter, the beverage dispenser 100/beverage preparation system 200 will start to prepare the mixed beverage 1004.

To prepare Juice C, valve 212 as well as the valve 205E are opened for a predetermined period of time 1005 and 1006 for the cold water to enter the mixer 210. Thereafter, the pump 204E in relation to the ingredient container 203E is turned on and the valve 205E in the second pre-mixer 215E remains opened after a predetermined delay 1007 for a mixture of Juice C and cold water to enter the mixer 210. The pump 204E and the valve 205E in relation to the Juice C are closed upon reaching the predetermined period of time 1008. The valve 205E in relation to water is closed 1009.

To prepare Juice D, valve 212 of the cooler as well as the valve 205F are opened 1010 for the cold water to enter the mixer 210. Thereafter, the pump 204F and the valve 205F are opened 1011 after a predetermined delay such that a mixture of Juice D and cold water enters the mixer 210. The pump 204F and the valve 205F in relation to the Juice D are closed after the predetermined period of time 1012. The valve 205F in relation to water is closed 1013. In step 1014, the cold water valve is closed. Water is used to pre-lubricate and rinse the mixer 210 before and after the making of the beverage. The water enters the mixer through the second pre-mixer 215A/215B/215C/215D/215E/215F.

Example 6

Figure 9D:
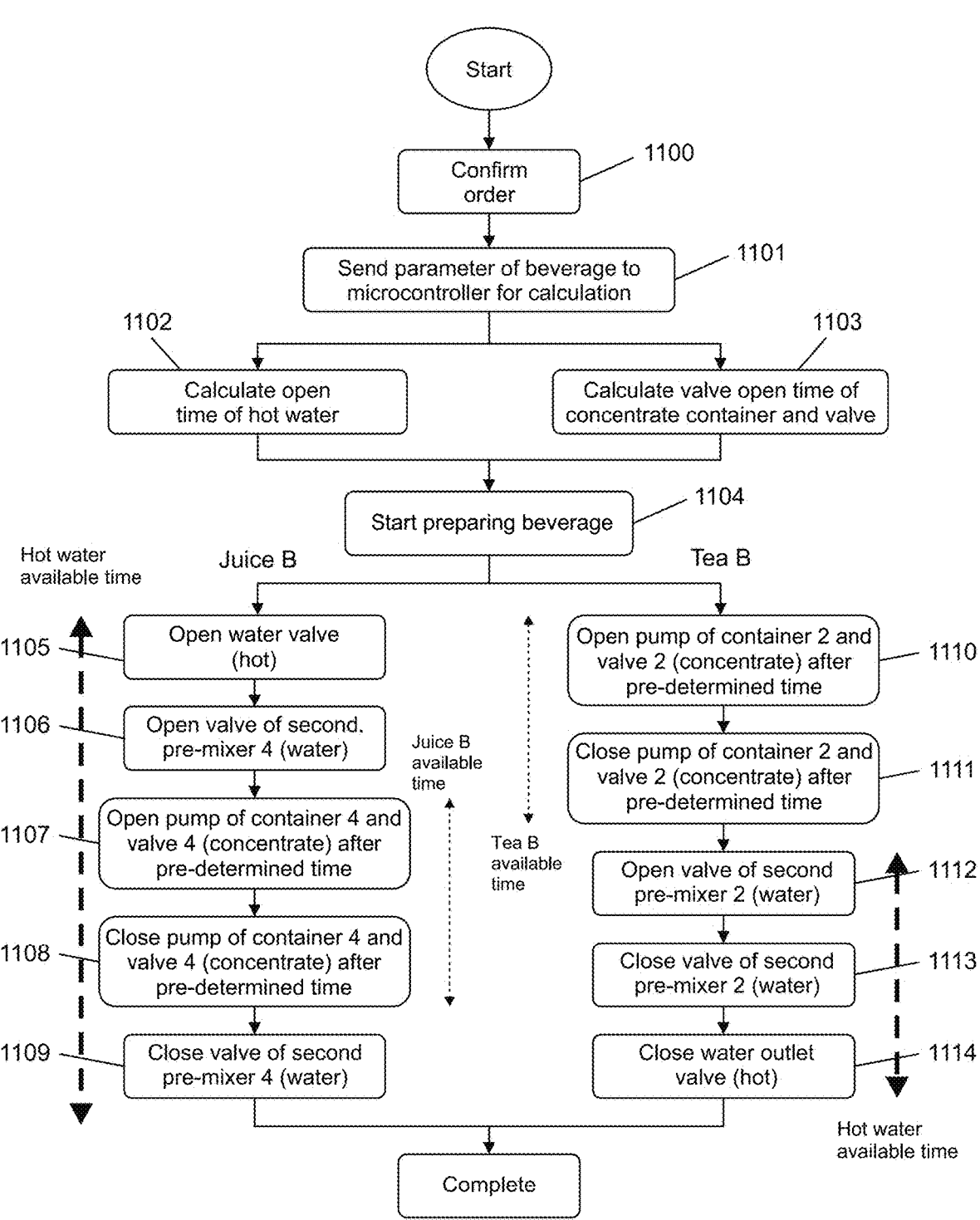
FIG. 9D is a block diagram showing function of the principal parts in the beverage preparation system connected by lines that show the relationship of the principal parts in preparing a Mixed Beverage made from Beverage B and Beverage D in FIG. 9A.

In FIG. 9D the preparation of a mixed beverage using three ingredients including water/diluting agent and two ingredients, Tea B and Juice B, from two ingredient containers 203B and 203D. Once an order is confirmed 1100, the instructions are sent to the controller 201 for handling 1101. The controller 201 will determine the length of time required for a solenoid valve 212 should be kept open 1102. The controller 201 will also determine the length of time required for the solenoid valve 205B and 205D of the relevant ingredient containers 203B and 203D to remain open 1103. Thereafter, the beverage dispenser 100/beverage preparation system 200 will start to prepare the mixed beverage 1004. The valve 212 will be opened 1105 to allow hot water to leave the heater. Then the valve 205D of the second pre-mixer 215D will be opened for a predetermined period of time 1106 for the hot water to enter the mixer 210. Thereafter, the pump 204D of the Juice B ingredient container 203D is turned on after a predetermined delay 1107. The valve 205D in the second pre-mixer 215D is remained open for a predetermined period of time 1107 for a mixture of ingredient and water to enter the mixer 210. In step 1108, the pump 204D and the valve 205D in relation to the Juice B are closed. Water is allowed to pass through the valve 205D of the second pre-mixer 215D to reach the mixer 210 for a predetermined period of time. The valve 205D in the second pre-mixer 2015D in relation to water are then closed 1109. The pump 204B and the valve 205B of the second pre-mixer 215B are opened for releasing the Tea B 1110. After a predetermined period of time, the pump 204B and the valve 205B of the second pre-mixer 215B are closed 1111. The valve 205B of the second pre-mixer 215B in relation to water is opened 1112 for rinsing the mixer 210. After a predetermined period of time, the valve 205B of the second pre-mixer 215B in relation to the water supply is closed 1113 and eventually the valve in the heater 208 is closed 1114. Water is used to pre-lubricate and rinse the mixer 210 before and after the making of the beverage. The water enters the mixer through the second pre-mixer 215A/215B/215C/215D/215E/215F.

Figure 4:
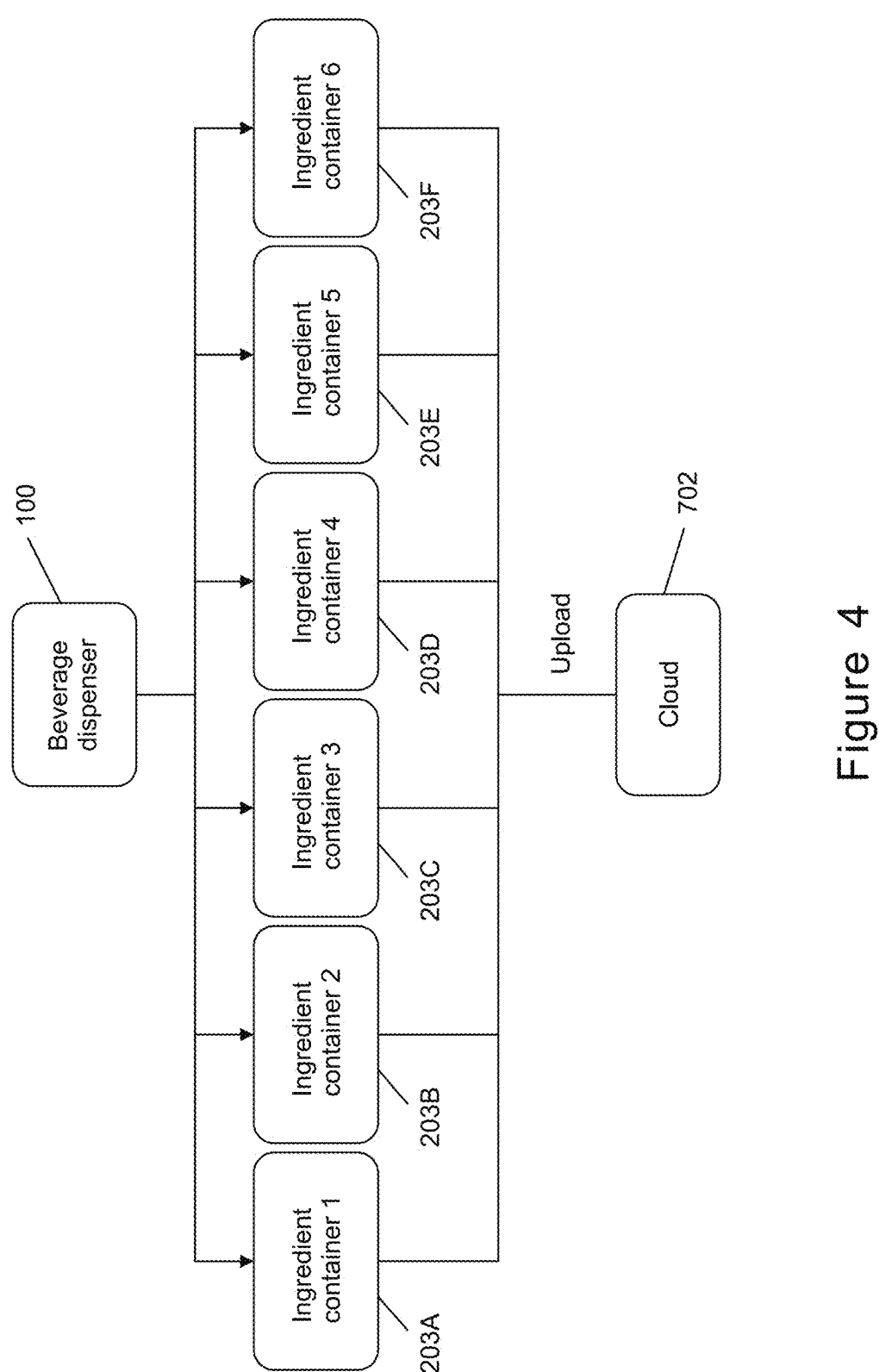
FIG. 4 is a block diagram showing the implementation of a part of a self-detection module in the beverage preparation system in FIG. 1.
Figure 5:
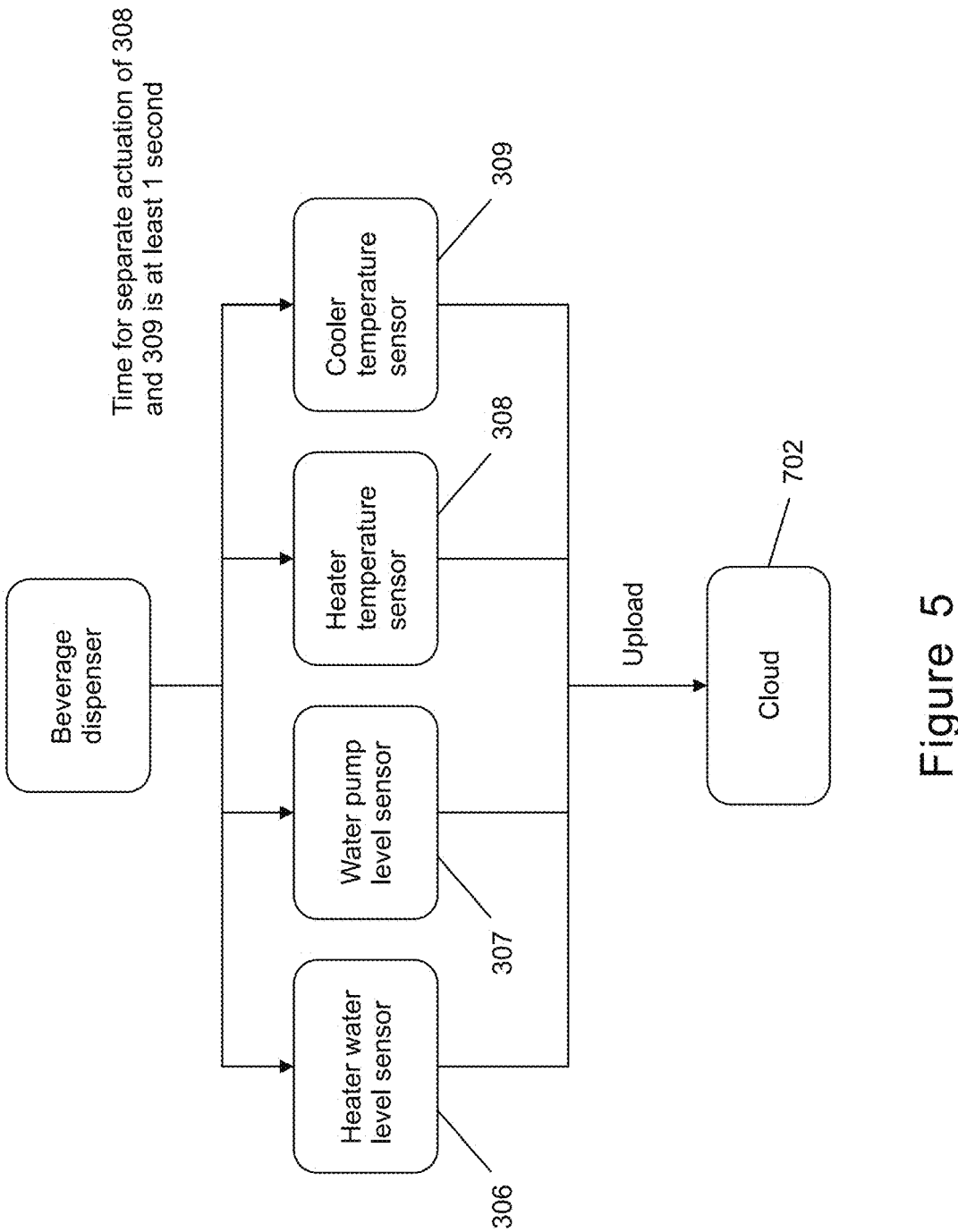
FIG. 5 is a block diagram showing the implementation of another part of the self-detection module in the beverage preparation system in FIG. 1.

With reference to FIGS. 3 to 5, the arrangement as shown makes possible self-detection by way of a self-detection module. The self-detection module at least includes the controller 201, the wireless communication module 202, the temperature sensor 302, the infrared sensor 303, the indicator 305, a liquid level sensor 310, a heater water level sensor 306, a water pump level sensor 307, a heater temperature sensor 308 and a cooler temperature sensor 309.

With reference to FIGS. 3 and 4, once the level of the ingredient is below a threshold, the indicator 305 will light up drawing attention for replacement or replenishment.

Sensors are provide with respective ingredient containers 203A to 203F for obtaining status information of the ingredient containers 203A to 203F. More specifically, the liquid level sensor is provided for sensing the level of ingredients and communicating the information to the controller 201. The controller 201 informs a remote party about the status of the ingredient containers 203A to 203F such as the level of ingredient being lower than a predetermined threshold via the wireless communication module 202 and uploading such information to a cloud 702 that can be accessed by the remote party. Simultaneously, the controller 201 activate the indicator 305 to provide visual indication on the beverage dispenser 100.

FIG. 5 is a simplified diagram showing the communication path between the heater water level sensor 306, the water pump level sensor 307, the heater temperature sensor 308 and the cooler temperature sensor 309 and the cloud. All information collected by these sensors 306-309 are sent to the controller 201 and then the cloud via the Wireless module 202 for retrieving by the relevant party.

Figure 10:
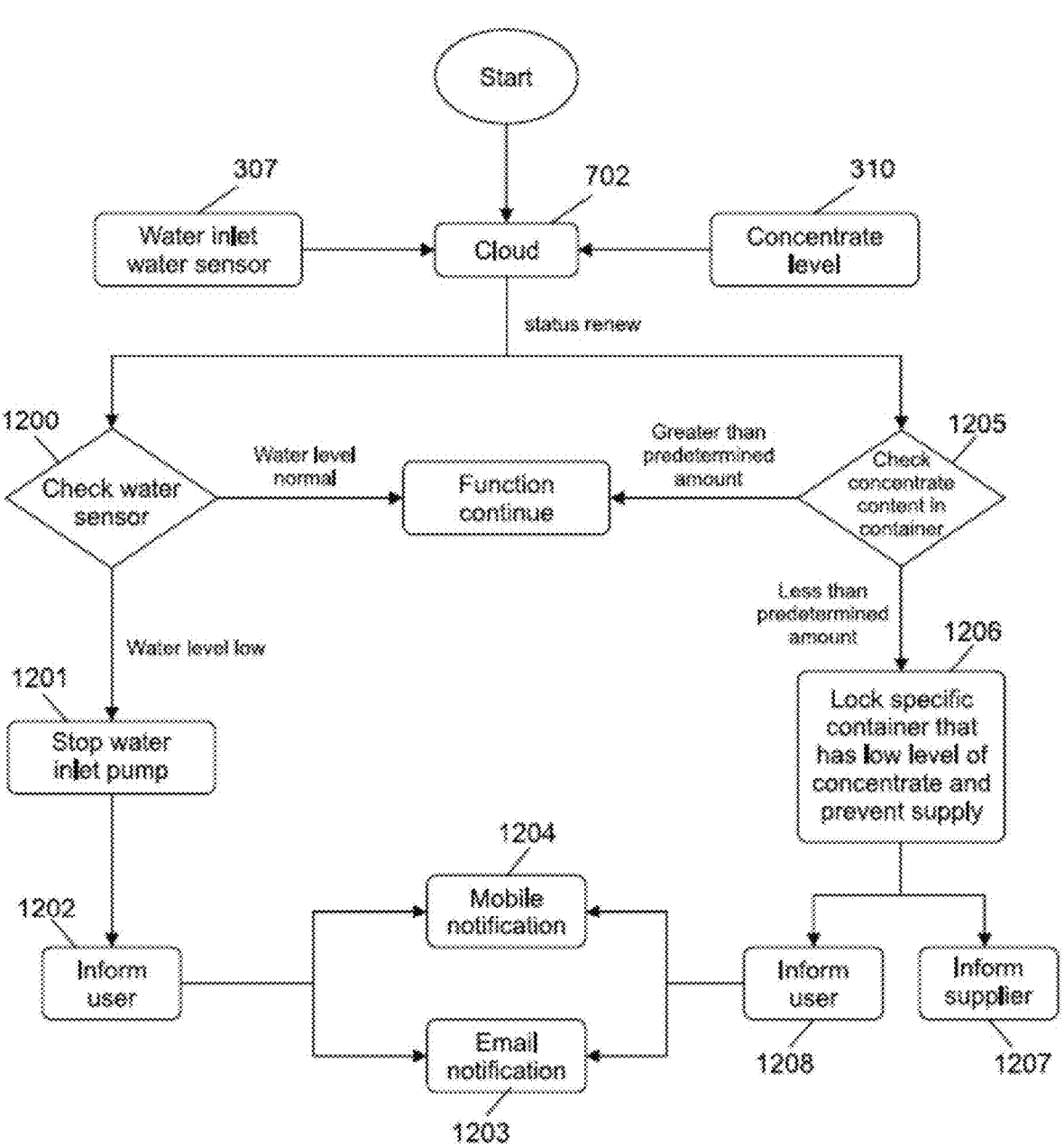
FIG. 10 is a block diagram showing the relationship between the self-detection module in FIGS. 4 and 5 and a resulting self-replenish module.

FIG. 10 is a block diagram showing how the self-detection module is implemented. The self-detection module can be initiated at the beverage dispenser 100 via the local instructions input device 300 or by way of a remote input device communicating with the controller 201 via the wireless communication module 202. Status information of the water pump 211 is provided by the water pump level sensor 307. Status information in relation to the ingredient containers 203A to 203F is provided by the liquid level sensor provided therewith. Both sensors 307 and 310 are in communication with the cloud 702 to communicate the status information wirelessly to the remote input device. When the water level at the water pump 211, sensed by the water pump level sensor 307, is lower than a predetermined threshold 1200, the controller 201 will be informed and the water pump 211 will be temporary shutdown 1201. The status information will be sent to the remote input device via the wireless communication module 202 and the cloud 702 to the relevant party for replenishment 1202. The status information may be sent by email or as a message to the relevant party 1203 and 1204. Upon testing the level of the ingredient 1205 in the ingredient container 203A to 203F, when the level of ingredient in the ingredient container 203A to 203F is below a predetermined threshold, the status information will be sent to the controller 201 which stops reserving any portion of the ingredient in the reservation module 1206. The status information will be sent to the relevant party via the wireless communication module 202 and the cloud 702 and the relevant party is informed by way of an email or a message for placing order and/or for replenishment 1207 and 1208. The beverage preparation system 200 will continue to function if the water level and the ingredient level are above the predetermined thresholds.

Figure 11:
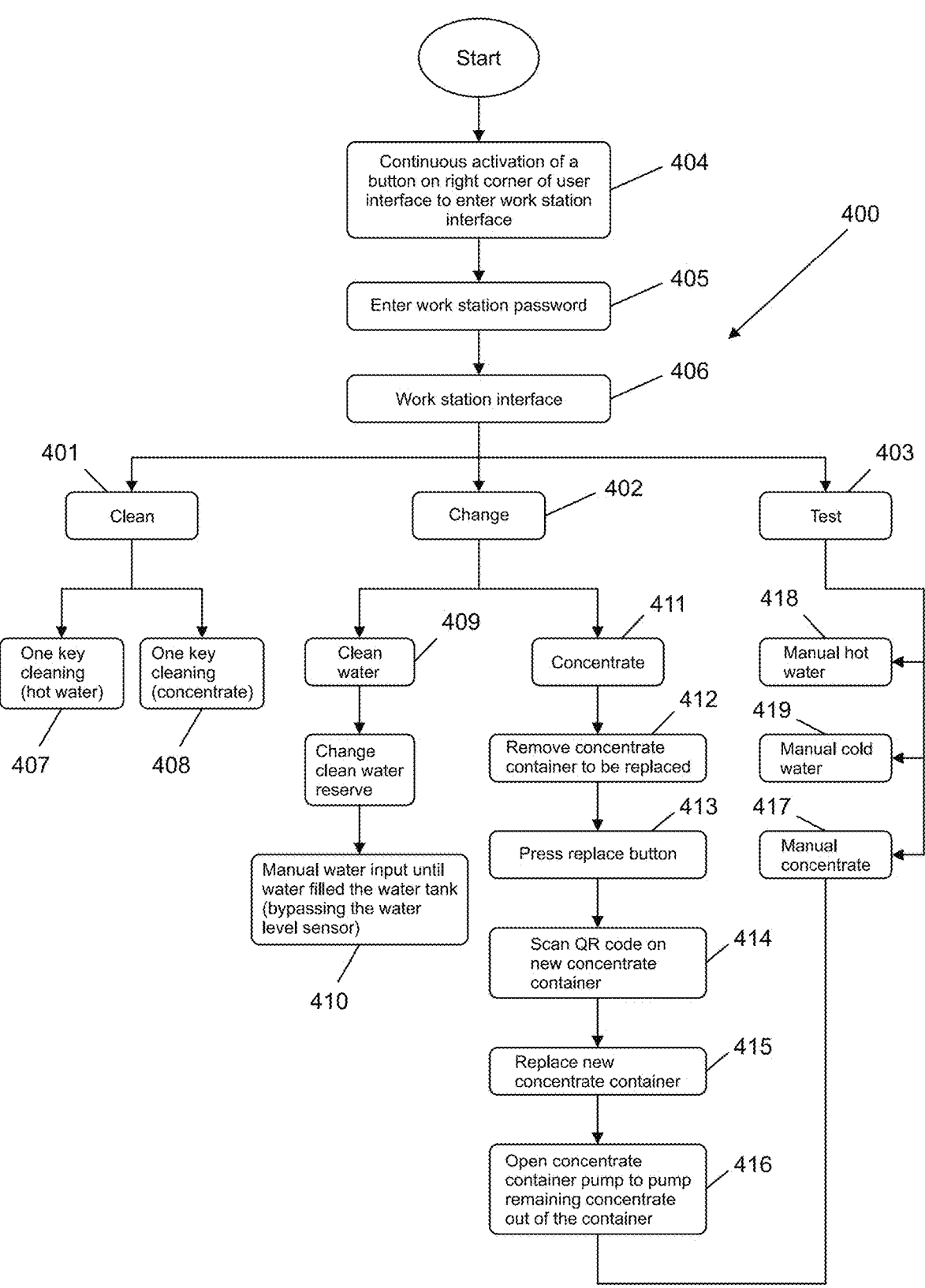
FIG. 11 is a block diagram showing function of the principal parts in the beverage preparation system connected by lines that show the relationship of the principal parts in a self-cleaning and a self-maintaining module.

Referring to FIG. 11, the beverage preparation system 200 has a management module 400 that can be initiated by a start button 404 actuable via the local instructions input device 300. Once actuated, a password is required 405 before a management interface 406 will present itself on a display. The management interface includes at least buttons for initiating a cleansing module 401, replacement module 402 and testing module 403. In the cleansing module 401, two options are available including cleansing with hot water or rinsing with concentrated syrup 407 and 408. In the replacement module, replacement of clean water can be selected 409 and manual replenishment of clean water is required 410. Replacement of concentrated syrup or flavored liquid is possible 411 by way of the following steps, 1) removing an old ingredient container 412, 2) actuating a replacement button 413, 3) presenting a code (QR code) printed on a new ingredient container to a scanner on the beverage dispenser 100 414, 4) inserting the new ingredient container 415, 5) initiating pump for pumping remainder of concentrated syrup or flavored liquid 416, 6) manually pumping out a portion of the concentrated syrup or flavored liquid for tasting 417. The testing module 403 involves manually testing the hot water supply 418, the cold water supply 419 and the concentrated syrup or flavored liquid supply 417.

The invention has been given by way of example only, and various other modifications of and/or alterations to the described embodiment may be made by persons skilled in the art by employing the aforementioned features of the invention yet without departing from the scope of the invention as specified in the appended claims.

The invention claimed is:

1. A beverage preparation system comprising:

at least one ingredient container for containing an ingredient;

a dispenser for dispensing said ingredient from said at least one ingredient container for preparation of a beverage;

a controller for controlling operation of the dispenser, wherein the operation includes a step of dispensing said ingredient; and a wireless communication module associated with the controller for receiving instructions from a remote device via wireless communication, configured to check the ingredient level of a required ingredient for preparation of the beverage and to confirm the availability of said required ingredient and to exercise control of the dispenser via the controller for reserving, in the ingredient container, a specific portion of said required ingredient;

wherein the dispenser includes a first ingredient container for containing a diluting agent and a second ingredient container for containing a flavored liquid;

the ingredient containers each with a respective valve for bringing about release of a predetermined amount of ingredient from the respective ingredient containers;

the dispenser includes a mixer downstream of the ingredient containers for receiving and mixing said ingredients released from the ingredient containers via the respective valves;

the first ingredient container is configured to release the diluting agent to the mixer before the second ingredient container releases said flavored liquid;

the first ingredient container is associated with a temperature adjuster for adjusting temperature of said diluting agent released from the first ingredient container; and the temperature adjuster includes a heater and a cooler both in fluid communication with the first ingredient container for adjusting temperature of said diluting agent.

2. The beverage preparation system as claimed in claim 1, wherein the controller generates an identifier based on said instructions from said remote device.

3. The beverage preparation system as claimed in claim 2, wherein the controller dispatches the identifier via the wireless communication module to said or another remote device.

4. The beverage preparation system as claimed in claim 3, wherein the controller is associated with an input device for retrieving information from the identifier upon presentation of the identifier via said remote device.

5. The beverage preparation system as claimed in claim 4, wherein the controller exercises control over the dispenser based on information retrieved from the identifier by the input device for bringing about release of the specific portion of said required ingredient from the ingredient container.

6. The beverage preparation system as claimed in claim 1, wherein the dispenser includes an outlet guarded by a valve for controlling an amount of ingredient to be dispensed from the outlet.

7. The beverage preparation system as claimed in claim 6, wherein the valve comprises an electromechanically operated valve.

8. The beverage preparation system as claimed in claim 1, wherein the diluting agent comprises water.

9. The beverage preparation system as claimed in claim 1, wherein at least one of the ingredient containers is in fluid communication with a temperature adjuster for adjusting temperature of said ingredient released from the ingredient container.

10. The beverage preparation system as claimed in claim 1, wherein the heater and the cooler are in parallel fluid connection with the first ingredient container.

11. The beverage preparation system as claimed in claim 10, wherein the heater and the cooler are in fluid communication with a first pre-mixer for mixing said diluting agent from the heater and the cooler to attain a predetermined temperature.

12. The beverage preparation system as claimed in claim 11, wherein the first pre-mixer is in fluid communication with the mixer for delivering said diluting agent of predetermined temperature into the mixer in advance of delivery of said flavored liquid from the second ingredient container.

13. The beverage preparation system as claimed in claim 12, wherein the first pre-mixer and the second pre-mixer are separately connected to the mixer, and while the second ingredient container is in fluid communication with the mixer via the second pre-mixer.

14. The beverage preparation system as claimed in claim 13, wherein the first pre-mixer is configured to prime the mixer by releasing said diluting agent to the mixer before the second pre-mixer releases said flavored liquid.

15. The beverage preparation system as claimed in claim 1, wherein the controller is configured to exercise control over the ingredient container based on instructions received from said remote device, for customizing an amount of said ingredient released from the ingredient container.

16. The beverage preparation system as claimed in claim 15, wherein the controller is configured to exercise control over the ingredient container in response to instructions received via an identifier generated based on instructions from said remote device.

17. The beverage preparation system as claimed in claim 16, wherein the identifier is generated by the controller and sent wirelessly to said remote device.

18. The beverage preparation system as claimed in claim 1, wherein the dispenser includes a self-detection module in communication with the controller, the self-detection module provides information in relation to a status of the dispenser to the controller which generates an indication for sending to said remote device via the wireless communication module.

19. The beverage preparation system as claimed in claim 1, wherein the mixer comprises a funnel.

20. A method for preparing said beverage by the beverage preparation system as claimed in claim 1, comprising the steps of:

providing instructions to the dispenser by the remote device for preparing said beverage, receiving the instructions by the controller via the wireless communication module in the dispenser, reserving the specific portion of said required ingredient by the controller for preparing said beverage, generating an identifier based on the instructions provided by the remote device, sending the identifier to the remote device, presenting the identifier received by the remote device to the controller, and releasing the specific portion of said required ingredient for the dispenser to prepare said beverage in response to instructions from the controller.

21. The method as claimed in claim 20, wherein the identifier is generated by the controller and is presented to the controller for preparing said beverage.

22. The method as claimed in claim 21 further comprising the step of providing a reader to the controller for reading the identifier.

\* \* \* \* \*